(12) United States Patent
Pastouchenko et al.

(10) Patent No.: US 10,399,670 B2
(45) Date of Patent: Sep. 3, 2019

(54) AIRCRAFT HAVING AN AFT ENGINE AND INTERNAL FLOW PASSAGES

(71) Applicant: General Electric Company, Schenectady, NY (US)

(72) Inventors: Nikolai N. Pastouchenko, Glenville, NY (US); Ivan Malcevic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 15/275,610

(22) Filed: Sep. 26, 2016

(65) Prior Publication Data

US 2018/0086437 A1    Mar. 29, 2018

(51) Int. Cl.
| | | |
|---|---|---|
| B64C 21/04 | (2006.01) | |
| B64C 21/06 | (2006.01) | |
| B64D 27/20 | (2006.01) | |

(52) U.S. Cl.
CPC .............. B64C 21/04 (2013.01); B64C 21/06 (2013.01); B64D 27/20 (2013.01); B64C 2230/04 (2013.01); Y02T 50/166 (2013.01)

(58) Field of Classification Search
CPC ....... B64C 21/025; B64C 21/04; B64C 21/08; B64C 2230/04; B64C 2230/06; B64D 27/20; B64D 2033/0226
See application file for complete search history.

(56) References Cited

U.S. PATENT DOCUMENTS

| | | |
|---|---|---|
| 3,604,661 A | 9/1971 | Mayer, Jr. |
| 4,311,289 A | 1/1982 | Finch |
| 4,736,913 A | 4/1988 | Bennett et al. |
| 4,749,151 A | 6/1988 | Ball et al. |
| 4,953,812 A | 9/1990 | Van Der Hoeven |
| 5,115,996 A | 5/1992 | Moller |

(Continued)

FOREIGN PATENT DOCUMENTS

| | | |
|---|---|---|
| EP | 0737616 B1 | 2/1998 |
| EP | 1550606 A2 | 7/2005 |

(Continued)

OTHER PUBLICATIONS

Liou et al., "Minimizing Inlet Distortion for Hybrid Wing Body Aircraft", Journal of Turbomachinery, vol. 134, Issue 3, 10 Pages, Jul. 15, 2011.

(Continued)

*Primary Examiner* — Joseph W Sanderson
(74) *Attorney, Agent, or Firm* — Dority & Manning, P.A.

(57) ABSTRACT

An air injection assembly for an aircraft is provided. The aircraft includes a fuselage extending between a forward end and an aft end along a longitudinal direction and a boundary layer ingestion fan mounted to the fuselage at the aft end of the fuselage. The air injection assembly includes a plurality of injection ports defined on a surface of the fuselage at a location upstream of the boundary layer ingestion fan. A supplemental airflow is provided through a fluid passageway to the injection ports where it is ejected to displace at least a portion of relatively higher velocity boundary layer airflow. In this manner, the airflow entering boundary layer ingestion fan is more uniform, has less swirl distortion, and has a lower average velocity.

18 Claims, 6 Drawing Sheets

(56) References Cited

U.S. PATENT DOCUMENTS

| | | | |
|---|---|---|---|
| 5,417,391 A | 5/1995 | Savitsky et al. | |
| 5,692,704 A | 12/1997 | Buttgereit et al. | |
| 5,779,189 A | 7/1998 | Hamstra et al. | |
| 5,957,405 A | 9/1999 | Williams | |
| 6,129,306 A | 10/2000 | Pham | |
| 6,149,101 A | 11/2000 | Tracy | |
| 7,309,046 B2 | 12/2007 | Makino | |
| 7,614,588 B2 | 11/2009 | Birkenstock | |
| 7,818,958 B2 | 10/2010 | Bulin et al. | |
| 7,861,968 B2 | 1/2011 | Parikh et al. | |
| 8,191,820 B1* | 6/2012 | Westra | B64C 9/12 244/207 |
| 9,120,552 B2 | 9/2015 | Kreshchishina et al. | |
| 9,611,034 B1* | 4/2017 | Suciu | B64C 21/08 |
| 9,862,482 B2* | 1/2018 | Huynh | B64C 21/08 |
| 2010/0200698 A1 | 8/2010 | Kreshchishin et al. | |
| 2015/0291285 A1* | 10/2015 | Gallet | F01D 13/02 415/60 |
| 2016/0122005 A1* | 5/2016 | Florea | B64C 21/04 244/53 B |
| 2016/0332741 A1* | 11/2016 | Moxon | B64C 15/00 |
| 2017/0066527 A1* | 3/2017 | Huynh | B64C 21/08 |
| 2017/0088276 A1* | 3/2017 | Gruber | B64D 29/06 |
| 2017/0121031 A1* | 5/2017 | Stieger | B64C 21/06 |
| 2017/0355450 A1* | 12/2017 | Zha | B64C 21/025 |
| 2017/0361939 A1* | 12/2017 | Negulescu | B64C 1/16 |
| 2018/0079514 A1 | 3/2018 | Ramakrishnan et al. | |
| 2018/0086436 A1 | 3/2018 | Pastouchenko et al. | |
| 2018/0086438 A1 | 3/2018 | Pastouchenko et al. | |

FOREIGN PATENT DOCUMENTS

| | | |
|---|---|---|
| EP | 2 995 553 A1 | 3/2016 |
| EP | 3 048 042 A1 | 7/2016 |
| FR | 2794718 A1 | 12/2000 |
| GB | 1032274 A | 6/1966 |
| WO | 2011129721 A1 | 10/2011 |

OTHER PUBLICATIONS

Guy Norris, "Boundary-Layer Ingestion Key to MIT/NASA D8 Hopes", Aviation Week & Space Technology, Sep. 30, 2013.

Sharma A., "Design of Inlet for Boundary Layer Ingestion in a Blended Wing Body Aircraft", TU Delft, Jan. 29, 2015.

International Search Report and Written Opinion issued in connection with corresponding PCT Application No. PCT/US2017/048522 dated Nov. 27, 2017.

* cited by examiner

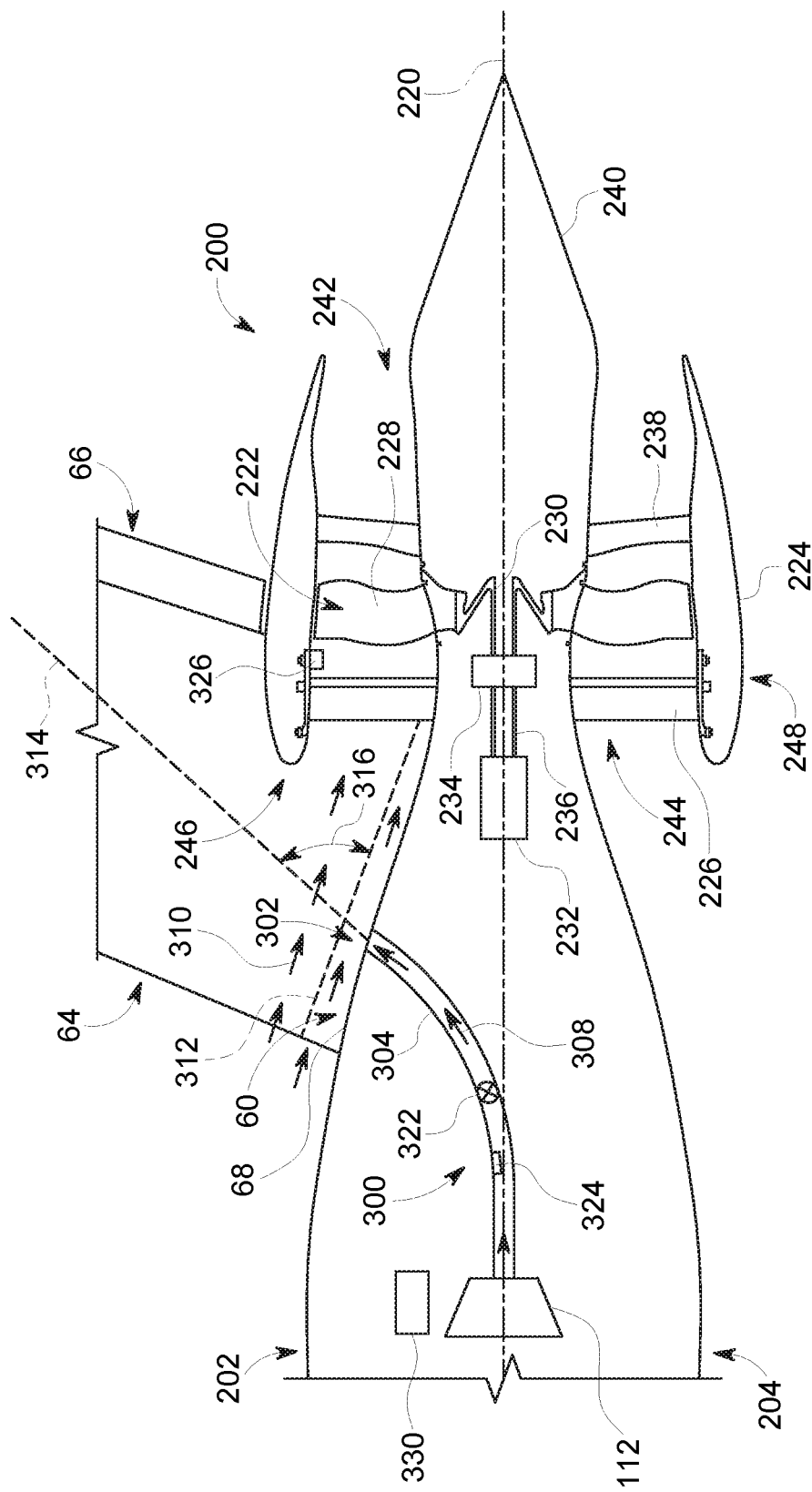

AIRCRAFT HAVING AN AFT ENGINE AND INTERNAL FLOW PASSAGES

FIELD OF THE INVENTION

The present subject matter relates generally to an aircraft having an aft engine, or more particularly to a fuselage of an aircraft having features for increasing an efficiency of the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reenergizing a boundary layer airflow over the aft end of the fuselage. However, given existing structures at the aft end of the fuselage, such as one or more stabilizers, the airflow ingested by such a fan may not have a consistent velocity profile along the circumferential direction of the fan. More specifically, the structures at the aft end of the fuselage may generate a wake resulting in swirl distortion and an inconsistent velocity profile of the airflow ingested by the fan along the circumferential direction.

Accordingly, an aircraft capable of energizing slow-moving air forming a boundary layer across the fuselage of the aircraft would be useful. Specifically, a fuselage of an aircraft designed to increase the ingestion of relatively low momentum boundary layer airflow into the aft engine and reduce the non-uniformity and distortion of the velocity profile of ingested airflow would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aircraft defining a longitudinal direction, a vertical direction, and a lateral direction is provided. The aircraft includes a fuselage extending between a forward end and an aft end along the longitudinal direction. A boundary layer ingestion fan is mounted to the fuselage at the aft end of the fuselage, the boundary layer ingestion fan defining a centerline and comprising a plurality of fan blades rotatable about the centerline. An air injection assembly includes a plurality of injection ports defined on a surface of the fuselage at a location upstream of the boundary layer ingestion fan and a fluid passageway, the fluid passageway extending through the fuselage and being in fluid communication with the plurality of injection ports for directing a supplemental airflow through the plurality of injection ports.

In another exemplary embodiment of the present disclosure, an air injection assembly for an aircraft is provided. The aircraft includes a fuselage extending between a forward end and an aft end along a longitudinal direction and a boundary layer ingestion fan mounted to the fuselage at the aft end of the fuselage. The air injection assembly includes a plurality of injection ports defined on a surface of the fuselage at a location upstream of the boundary layer ingestion fan and a fluid passageway, the fluid passageway extending through the fuselage and being in fluid communication with the plurality of injection ports for directing a supplemental airflow through the plurality of injection ports.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 is a schematic, cross-sectional side view of an aft end of the fuselage of the exemplary aircraft of FIG. 1 in accordance with another exemplary embodiment of the present disclosure.

DETAILED DESCRIPTION OF THE INVENTION

Figure 1:
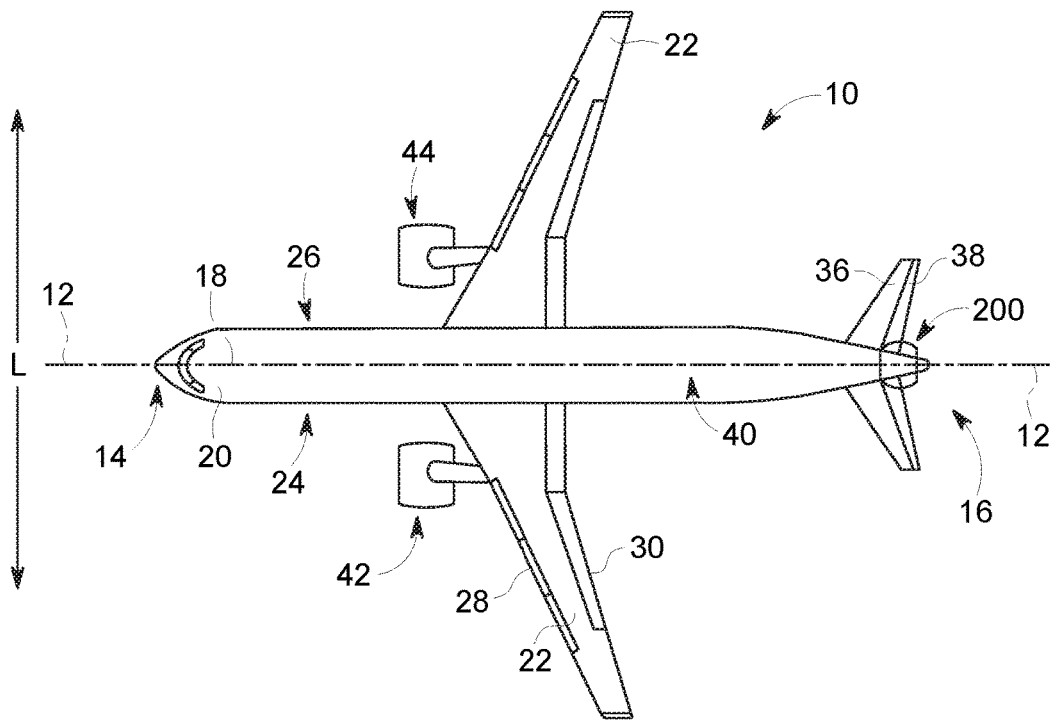
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
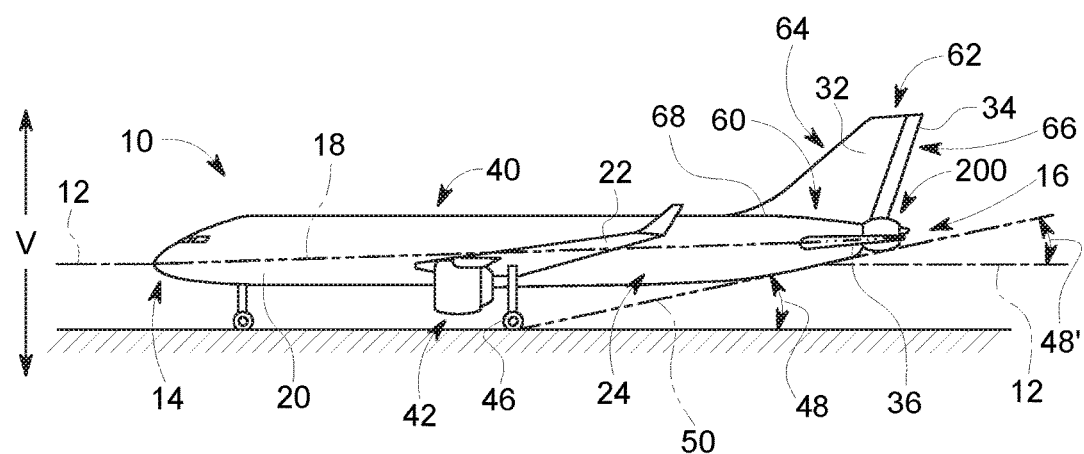
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal direction 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. As used herein, the term "fuselage" generally includes all of the body of the aircraft 10, such as an empennage of the aircraft 10 and an outer surface or skin of the aircraft 10. The first of such wings 22 extends laterally outwardly with respect to the longitudinal direction 12 from the port side 24 of the fuselage 20 and the second of such wings 22 extends laterally outwardly with respect to the longitudinal direction 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

As illustrated, each stabilizer extends between a root portion and a tip portion substantially within a single plane. For example, as illustrated in FIGS. 1 and 2, vertical stabilizer 32 defines a root portion 60 and a tip portion 62 separated along the vertical direction V. In addition, vertical stabilizer 32 extends between a leading edge 64 and a trailing edge 66 along the longitudinal direction 12. As illustrated, vertical stabilizer 32 is mounted to fuselage 20 at root portion 60 and extends substantially along the vertical direction V to tip portion 62. In this manner, a junction line 68 is defined at the intersection of vertical stabilizer 32 and fuselage 20. More specifically, junction line 68 extends between leading edge 64 and trailing edge 66 of vertical stabilizer 32. However, it should be appreciated that in other exemplary embodiments of the present disclosure, the aircraft 10 may additionally or alternatively include any other suitable configuration of stabilizers that may or may not extend directly along the vertical direction V or horizontal/lateral direction L. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. The aft engine 200, which is generally configured as an engine that ingests and consumes air forming a boundary layer over fuselage 20, will be discussed in greater detail below with reference to FIGS. 4 through 7.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. More specifically, takeoff angle 48 may be defined as the angle between the ground (parallel to longitudinal direction 12) and a takeoff plane 50. As will be discussed below, the exemplary fuselage 20 and aft engine 200 described herein are designed to allow the aircraft 10 to maintain a desired takeoff angle 48, despite the addition of the aft engine 200 proximate the aft end 16 of the aircraft 10. Notably, for the embodiment depicted, the longitudinal direction 12 of the aircraft 10 is parallel to the ground when the aircraft 10 is on the ground. Accordingly, the maximum takeoff angle 48, as shown, may alternatively be defined with the longitudinal direction 12 of the aircraft 10 (shown as angle 48' in FIG. 2).

Figure 3:
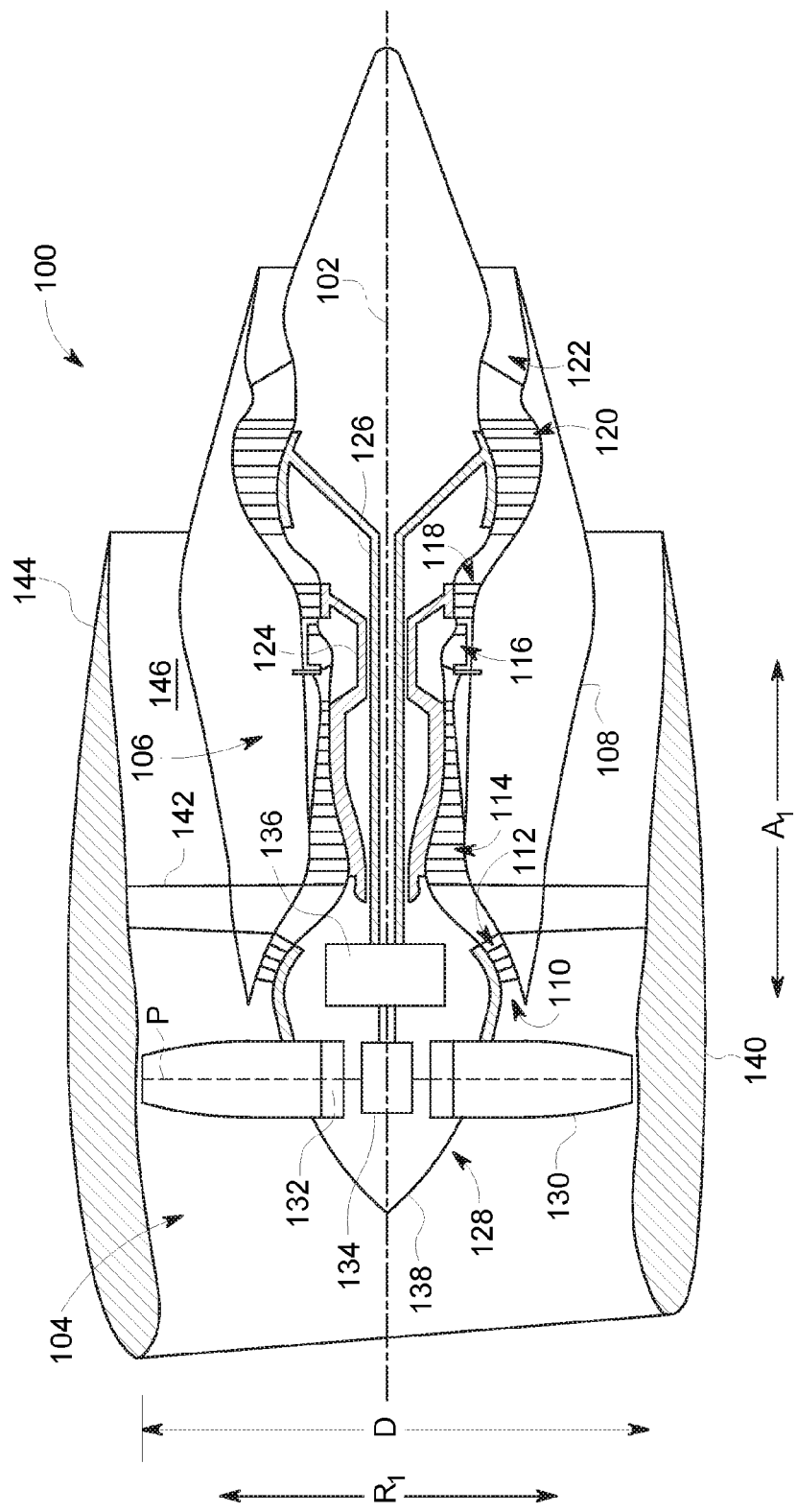
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3. Alternatively, however, in other exemplary embodiments, one or both of aircraft engines 42, 44 may be configured as any other suitable engines, such as a turboshaft, turboprop, turbojet, etc.

As shown in FIG. 3, the turbofan engine 100 defines an axial direction $A_1$ (extending parallel to a longitudinal centerline 102 provided for reference) and a radial direction $R_1$. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction $R_1$ and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. According to alternative embodiments, the fan blades 130 may instead have a fixed pitch. The fan blades 130, disk 132, and actuation member 134 are together rotatable about the longitudinal direction 12 by LP shaft 126 across a power gear box 136. The power gear box 136 includes a plurality of gears for adjusting the rotational speed of the fan 128 relative to the LP shaft 126 to a more efficient rotational fan speed. It should be appreciated that power gear box 136 is optional and is not used in some embodiments.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

Figure 4:
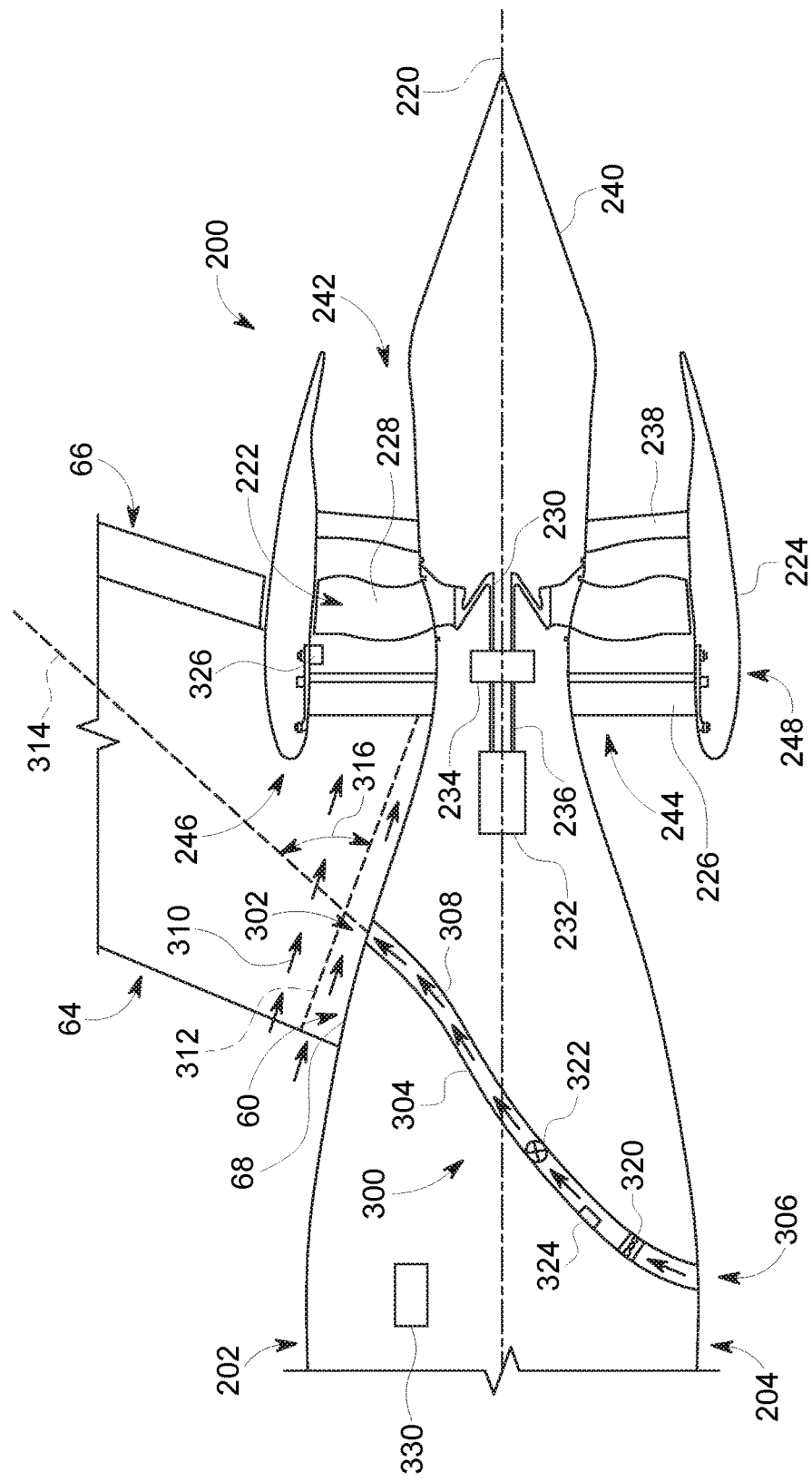
FIG. 4 is a schematic, cross-sectional side view of an aft end of a fuselage of the exemplary aircraft of FIG. 1 in accordance with an exemplary embodiment of the present disclosure.

Referring now also to FIG. 4, a close-up, schematic, cross-sectional view of the exemplary aft engine 200 of FIGS. 1 and 2 is provided. As discussed, the exemplary aft engine 200 is mounted to the fuselage 20 proximate the aft end 16 of the aircraft 10. The aft engine 200 depicted defines an axial direction $A_2$ extending along a longitudinal centerline axis 220 that extends therethrough for reference, a radial direction $R_2$, and a circumferential direction $C_2$ (not shown).

Additionally, for the embodiment depicted, the aft engine 200 is configured as a boundary layer ingestion engine configured to ingest and consume air forming a boundary layer over the fuselage 20 of the aircraft 10. The aft engine 200 includes a fan 222 rotatable about the centerline axis 220, a nacelle 224 extending around a portion of the fan 222, and one or more structural members 226 extending between the nacelle 224 and the fuselage 20 of the aircraft 10. The fan 222 includes a plurality of fan blades 228 spaced generally along circumferential direction $C_2$. Additionally, the nacelle 224 extends around and encircles the plurality of fan blades 228 and a portion of the fuselage 20. Specifically, the nacelle 224 extends around at least a portion of the fuselage 20 of the aircraft 10 when, as in FIG. 4, the aft engine 200 is mounted to the aircraft 10.

As is also depicted in FIG. 4, the fan 222 further includes a fan shaft 230 with the plurality of fan blades 228 attached thereto. Although not depicted, the fan shaft 230 may be rotatably supported by one or more bearings located forward of the plurality of fan blades 228 and, optionally, one or more bearings located aft of the plurality of fan blades 228. Such bearings may be any suitable combination of roller bearings, ball bearings, thrust bearings, etc.

In certain exemplary embodiments, the plurality of fan blades 228 may be attached in a fixed manner to the fan shaft 230, or alternatively, the plurality of fan blades 228 may be rotatably attached to the fan shaft 230. For example, the plurality of fan blades 228 may be attached to the fan shaft 230 such that a pitch of each of the plurality of fan blades 228 may be changed, e.g., in unison, by a pitch change mechanism (not shown).

The fan shaft 230 is mechanically coupled to a power source 232 located at least partially within the fuselage 20 of the aircraft 10. For the embodiment depicted, the fan shaft 230 is mechanically coupled to the power source 232 through a gearbox 234. The gearbox 234 may be configured to modify a rotational speed of the power source 232, or rather of a shaft 236 of the power source 232, such that the fan 222 of the aft engine 200 rotates at a desired rotational speed. The gearbox 234 may be a fixed ratio gearbox, or alternatively, the gearbox 234 may define a variable gear ratio.

The power source 232 may be any suitable power source. For example, in certain exemplary embodiments the power source 232 may be an electric power source (e.g., the aft engine 200 may be configured as part of a gas-electric propulsion system with the first and/or second aircraft engines 42, 44). However, in other exemplary embodiments, the power source 232 may alternatively be configured as a dedicated gas engine, such as a gas turbine engine. Moreover, in certain exemplary embodiments, the power source 232 may be positioned at any other suitable location within, e.g., the fuselage 20 of the aircraft 10 or the aft engine 200. For example, in certain exemplary embodiments, the power source 232 may be configured as a gas turbine engine positioned at least partially within the aft engine 200.

Referring still to FIG. 4, the one or more structural members 226 extend between the nacelle 224 and the fuselage 20 of the aircraft 10 at a location forward of the plurality of fan blades 228. The one or more structural members 226 for the embodiment depicted extend substantially along the radial direction $R_2$ between the nacelle 224 and the fuselage 20 of the aircraft 10 for mounting the aft engine 200 to the fuselage 20 of the aircraft 10. It should also be appreciated, however, that in other exemplary embodiments the one or more structural members 226 may instead extend substantially along the axial direction $A_2$, or in any other suitable direction between the axial and radial directions $A_2$, $R_2$. It should be appreciated, that as used herein, terms of approximation, such as "approximately," "substantially," or "about," refer to being within a ten percent margin of error.

The one or more structural members 226 depicted are configured as inlet guide vanes for the fan 222, such that the one or more structural members 226 are shaped and oriented to direct and condition a flow of air into the aft engine 200 to increase an efficiency of the aft engine 200. In certain exemplary embodiments, the one or more structural members 226 may be configured as fixed inlet guide vanes extending between the nacelle 224 and the fuselage 20 of the aircraft 10, or alternatively the one or more structural members 226 may be configured as variable inlet guide vanes.

Moreover, the aft engine 200 includes one or more outlet guide vanes 238 and a tail cone 240. The one or more outlet guide vanes 238 for the embodiment depicted extend between the nacelle 224 and the tail cone 240 for, e.g., adding strength and rigidity to the aft engine 200, as well as for directing a flow of air through the aft engine 200. The outlet guide vanes 238 may be evenly spaced along the circumferential direction $C_2$, or may have any other suitable spacing. Additionally, the outlet guide vanes 238 may be fixed outlet guide vanes, or alternatively may be variable outlet guide vanes.

Aft of the plurality of fan blades 228, and for the embodiment depicted, aft of the one or more outlet guide vanes 238, the aft engine 200 additionally defines a nozzle 242 between the nacelle 224 and the tail cone 240. The nozzle 242 may be configured to generate an amount of thrust from the air flowing therethrough, and the tail cone 240 may be shaped to minimize an amount of drag on the aft engine 200. However, in other embodiments, the tail cone 240 may have any other shape and may, e.g., end forward of an aft end of the nacelle 224 such that the tail cone 240 is enclosed by the nacelle 224 at an aft end. Additionally, in other embodiments, the aft engine 200 may not be configured to generate any measurable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Referring still to FIG. 4, the aft engine 200, or rather the nacelle 224, defines an inlet 244 at a forward end 246 of the nacelle 224. The inlet 244 is defined by the nacelle 224 with the fuselage 20, i.e., between the nacelle 224 and the fuselage 20. As mentioned above, the nacelle 224 of the aft engine 200 extends around and surrounds the plurality of fan blades 228 of the fan 222 of the aft engine 200. For the embodiment depicted, nacelle 224 also extends at least partially around the central axis 220 of the aft engine 200, and at least partially around the mean line 18 of the aircraft 10. Specifically, for the embodiment depicted, the nacelle 224 extends substantially three hundred and sixty degrees (360°) around the central axis 220 of the aft engine 200, and substantially three hundred and sixty degrees (360°) around the mean line 18 of the aircraft 10.

Notably, by positioning the aft engine 200 such that the nacelle 224 of the aft engine 200 extends at least partially around the fuselage 20 proximate the aft end 16 of the aircraft 10, a bottom portion 248 of the nacelle 224 may not interfere with, e.g., the takeoff angle 48 of the aircraft 10 (see FIG. 2). For example, as shown, the nacelle 224 of the aft engine 200 includes at least a portion located inward of the takeoff plane 50 defined by the fuselage 20 (see FIG. 2). Particularly for the embodiment depicted, an entirety of the bottom portion 248 of the nacelle 224 is positioned in-line with, or inwardly of the takeoff plane 50 of the fuselage 20. For at least certain prior art aircrafts, the takeoff plane 50 of the fuselage 20 indicates the conventional shape for a bottom portion of a fuselage at an aft end of an aircraft.

Referring now to FIGS. 4 through 7, an injection assembly 300 configured for providing improved boundary layer ingestion will be described in more detail. More specifically, FIGS. 4 through 7 provide injection assemblies 300 having various configurations as part of aircraft 10. Although the various injection assemblies 300 are different, similar reference numerals will be used to describe them. In addition, although described in reference to exemplary aircraft 10, it should be appreciated that injection assemblies 300 may be defined in the fuselage of any suitable aircraft to provide a supplemental airflow to displace and/or redirect a primary boundary layer airflow over the fuselage. Injection assemblies 300 may also be modified as desired depending on the particular application to increase the ingestion of boundary layer airflow into aft engine 200.

Referring specifically to FIG. 4, according to an exemplary embodiment, air injection assembly 300 includes an injection port 302 defined on a surface of fuselage 20. More specifically, according to the illustrated embodiment, injection port 302 is positioned on top side 202 of fuselage 20 at a location upstream of aft engine 200, and more specifically upstream of inlet 244. Injection port 302 is fluidly coupled with a fluid passageway 304 that extends through fuselage 20. According to the exemplary embodiment of FIG. 4, fluid passageway 304 extends between an inlet port 306 and injection port 302. In this manner, fluid passageway 304 receives a supplemental airflow (indicated by arrows 308) via inlet port 306 and supplies it to injection port 302.

As will be described below, during operation of the aircraft 10, a primary airflow (indicated by arrows 310) may have an uneven velocity profile along the circumferential direction $C_2$ of the aft engine 200. Specifically, primary airflow 310 over top side of fuselage 20 may have a greater momentum than primary airflow 310 over a bottom side of fuselage 20. Inlet port 306 is positioned to receive the supplemental airflow 308 from a location outside of fuselage 20 of aircraft 10 and injection port 302 is positioned to exhaust the supplemental airflow 308 in a manner that at least partially displaces and/or redirects the high momentum primary airflow 310, e.g., by pushing it upwards along the vertical direction V. According to the embodiment illustrated in FIG. 4, inlet port 306 is defined in bottom side 204 of fuselage 20. In addition, inlet port 306 is positioned upstream of injection ports 302 along the longitudinal direction 12. The injection port 302 and fluid passageway 304 may be positioned and oriented such that the supplemental airflow 308 causes the higher velocity primary airflow 310 to bypass fan inlet 244. In this manner, the lower momentum supplemental airflow 308 enters fan inlet 244 and results in a more uniform velocity distribution about the circumferential direction $C_2$ of aft engine 200.

Figure 5:
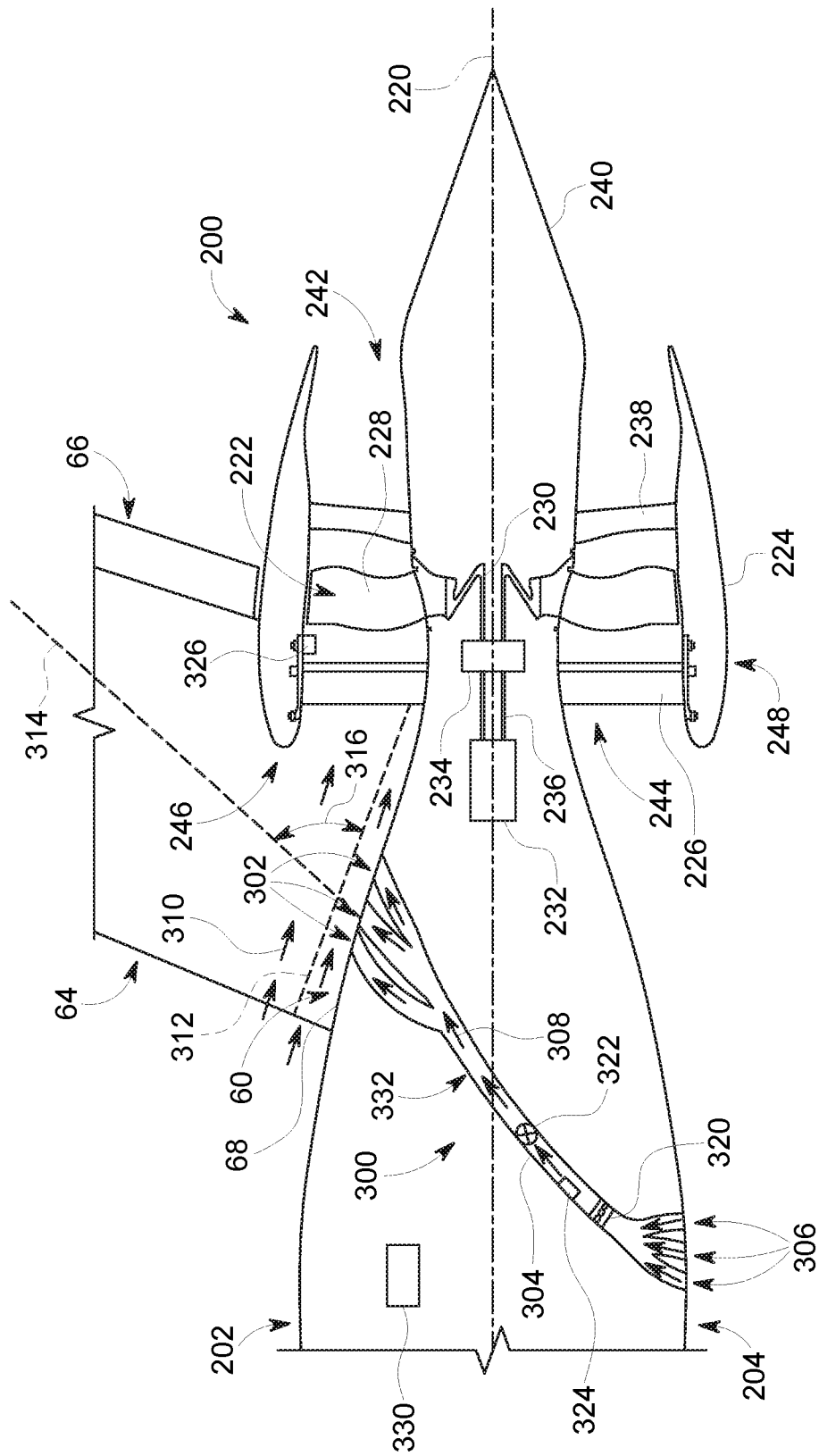
FIG. 5 is a schematic, cross-sectional side view of an aft end of the fuselage of the exemplary aircraft of FIG. 1 in accordance with another exemplary embodiment of the present disclosure.

For example, referring still to FIG. 4, top side 202 of fuselage 202 defines the primary airflow 310 line, path, or trajectory (as indicated by a first reference line 312). Similarly, fluid passageway 304 and injection port 302 define the direction of supplemental airflow 308 (as indicated by a second reference line 314). According to the illustrated embodiment, first reference line 312 (corresponding to primary airflow 310) and second reference line 314 (corresponding to supplemental airflow 308) define an injection angle 316. The injection angle 316 may be designed to ensure that the supplemental airflow 308 is exhausted from injection port 302 along a trajectory that redirects the primary airflow 310 as desired. For example, the injection angle 316 may be between five degrees and 85 degrees. According to other embodiments, the injection angle 316 is less than forty-five degrees. The injection angle 316 may be selected such that the relatively lower velocity supplemental airflow 308 at least partially displaces or redirects the relatively high velocity primary airflow 310, such that a resulting velocity profile entering inlet 244 is substantially constant along the circumferential direction $C_2$. As illustrated in FIG. 5, the injection ports 302 are configured such that injection angle 316 is partially aligned with the primary airflow 310.

Still referring to FIG. 4, injection assembly 300 may further include various features for controlling the supplemental airflow 308. For example, the exemplary injection assembly 300 depicted includes a boost fan 320. Boost fan 320 is in fluid communication with fluid passageway 304 for increasing a pressure or velocity of the supplemental airflow 308. In addition, injection assembly 300 includes a valve 322 for controlling the supplemental airflow 308 through fluid passageway 304. For the embodiment depicted, boost fan 320 is an electric fan positioned within fluid passageway 304 and valve 322 is a variable throughput valve configured for controlling the flow rate of the supplemental airflow 308.

Additionally, injection assembly 300 includes one or more sensors include, such as an airflow duct sensor 324 positioned in or adjacent to fluid passageway 304 for determining one or more of a pressure or velocity of the supplemental airflow 308 through fluid passageway 304. Notably, the aircraft 10 further includes additional sensors for measuring parameters of the aircraft 10, which may also be used to control injection assembly 300. For example, the aircraft 10 includes a sensor 326 for measuring at least one of a pressure or velocity of an airflow entering fan inlet 244.

Further, for the embodiment depicted, injection assembly 300 additionally includes a controller 330, which may in certain exemplary embodiments be configured as part of a main aircraft controller, operably connected to boost fan 320, valve 322, and sensors 324, 326 through one or more wired or wireless communication buses. Controller 330 may be configured to operate boost fan 320 and/or valve 322 at least in part in response to the pressures and/or velocities measured by the sensors 324, 326.

Controller 330 may be any suitable controller. For example, controller 330 may include one or more computing devices having one or more processors and one or more memory devices for storing information accessible to the one or more processors. The controller may further include a communication interface operably connected to one or more wired or wireless communication buses allowing controller 330 to communicate with various other components of the aircraft 10.

It should be appreciated, however, that the exemplary embodiment depicted in FIG. 4 is provided by way of example only. In other exemplary embodiments, aircraft 10 and injection assembly 300, may instead be configured in any other suitable manner. For example, referring now to FIGS. 5 and 6, cross-sectional side views of alternative injection assemblies 300 defined in fuselage 20 of aircraft 10 are described in accordance with other exemplary embodiments of the present disclosure. The exemplary aircraft 10 of FIGS. 5 and 6 may be configured in substantially the same manner as exemplary aircraft 10 of FIG. 4, and accordingly, the same numbers refer to the same or similar parts.

Referring to FIG. 5, aircraft 10 includes a fluid passageway 304 extending between an inlet port 306 and an injection port 302, with inlet port 306 positioned to receive an airflow from a location outside fuselage 20 and injection port 302 positioned to exhaust the supplemental airflow 308 to at least partially displace or redirect the primary airflow 310 upstream of aft engine 200. However, for the embodiment depicted, the inlet port 306 of fluid passageway 304 includes a plurality of inlet ports 306 defined by the fuselage 12 of the aircraft 10 at a bottom side 204 of fuselage 20 of aircraft 10. Additionally, for the embodiment depicted, injection port 302 of fluid passageway 304 includes a plurality of injection ports 302. The plurality of injection ports 302 are arranged along top side 202 of fuselage 20 upstream of aft engine 200.

The plurality of inlet ports 306 and injection ports 302 may be arranged in any suitable manner along fuselage 20 to achieve the desired supplemental airflow 308 for a particular application. For example, according to exemplary embodiments, inlet ports 306 and injection ports 302 may be spaced along the longitudinal direction 12 (as shown) and/or along the circumferential direction $C_2$ (not depicted). Inlet ports 306 and injection ports 302 may be arranged linearly, or in a zig-zag pattern, or in any other suitable pattern. Other patterns and configurations are also possible and within the scope of the present subject matter.

Additionally, each of inlet ports 306 and injection ports 302 may be substantially evenly spaced and substantially the same size, or alternatively, may vary in spacing and/or size in order to more effectively supply the supplemental airflow 308 as desired. For example, inlet ports 306 and injection ports 302 may be circular, elliptical, square, oblong, or any other suitable shape or combination of shapes. Similarly, fluid passageway 304 may be routed along a straight line between inlet ports 306 and injection ports 302, or may travel through fuselage 20 in along any suitable path for improving the velocity, ejection angle, or flow rate of the supplemental airflow 308. Moreover, it should be appreciated that in other exemplary embodiments, the inlet ports 306 may include any suitable number of inlet ports 306, and similarly, the injection ports 302 may include any suitable number of injection ports 302.

Figure 6:
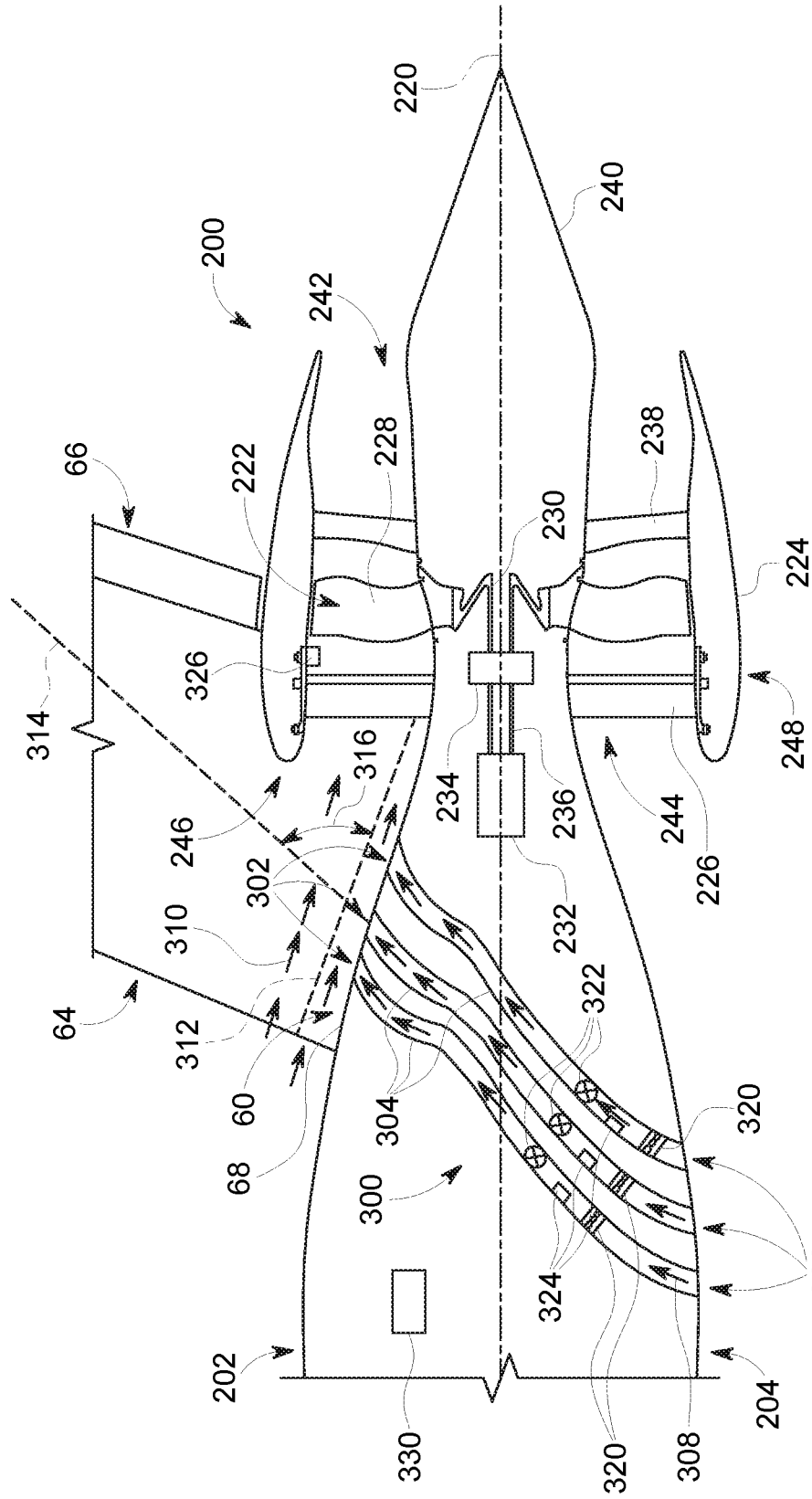
FIG. 6 is a schematic, cross-sectional side view of an aft end of the fuselage of the exemplary aircraft of FIG. 1 in accordance with another exemplary embodiment of the present disclosure.

For the embodiment depicted in FIG. 5, the plurality of inlet ports 306 converge to a single body portion 332 of fluid passageway 304 prior to subsequently splitting off to the plurality of injection ports 302. However, in other embodiments, such as illustrated in FIG. 6, fluid passageway 304 may include a plurality of fluid passageways 304 extending from respective inlet ports 306 to respective injection ports 302. Each of the respective inlet ports 306 may be defined by fuselage 20 of aircraft 10 at bottom side 204 of fuselage 20, or alternatively, may be defined in any other suitable location.

Referring now to FIG. 7, according to some exemplary embodiments, fluid passageway 304 may receive supplemental airflow 308 from locations other than the surface of fuselage 20. For example, as illustrated, fluid passageway 304 is configured for drawing bleed air from a compressor, e.g., LP compressor 112, of gas turbine engine 100, e.g., first or second aircraft engine 42, 44. Moreover, one or more pressure regulators may be used to regulate the pressure of the supplemental airflow 308 received from LP compressor 112 to achieve the desired velocity, flow rate, etc. of the supplemental airflow 308. Other embodiments may include receiving high pressure air from downstream of fan 222 or aft engine 200.

Injection assemblies 300 as described above may be useful for more effectively distributing the boundary layer airflow ingested by aft engine 200. The shape, size, configuration of injection ports and fluid passageway may be optimized to displace the boundary layer airflow to maximize the ingestion of low velocity air by the aft engine 200, to provide a more uniform velocity distribution to the aft engine 200 about the circumferential direction $C_2$ of the fuselage 20 and fan inlet 244, and to improve the propulsive efficiency of aircraft 10. In addition, the velocity of the boundary layer air flowing into the aft engine 200 may be similar from a top half to a bottom half, thus improving propulsive efficiency while reducing vibration, noise, and wear on the plurality of fan blades 228. The source of supplemental airflow 308 may be drawn from any suitable location within or around aircraft 10 and may be operably coupled to injection ports 302 in any suitable manner to achieve optimal displacement of boundary layer airflow. Notably, however, drawing the supplemental airflow 308 from the bottom half of fuselage 20 results in lower pressure along the bottom half, thereby reducing the pressure difference between the top half and the bottom half and reducing swirl distortion.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction, a vertical direction, and a lateral direction, the aircraft comprising:
   a fuselage extending between a forward end and an aft end along the longitudinal direction;
   a boundary layer ingestion fan mounted to the fuselage at the aft end of the fuselage, the boundary layer ingestion fan defining a centerline and comprising a plurality of fan blades rotatable about the centerline; and
   an air injection assembly comprising:
      a plurality of injection ports defined on a top surface of the fuselage at a location upstream of the boundary layer ingestion fan;
      a fluid passageway, the fluid passageway extending through at least a portion of the fuselage and being in fluid communication with the plurality of injection ports for directing a supplemental airflow through the plurality of injection ports; and
      a plurality of inlet ports defined on a bottom surface of the fuselage,
   wherein the fluid passageway extends between the plurality of inlet ports and the plurality of injection ports, and
   wherein the air injection assembly further comprises a boost fan disposed within the fluid passageway, the boost fan being in fluid communication with the fluid passageway for increasing a pressure of the supplemental airflow.

2. The aircraft of claim 1, further comprising a wing-mounted gas turbine engine comprising a compressor, the wing-mounted gas turbine engine disposed longitudinally forward of the boundary layer ingestion fan, and
   wherein the fluid passageway is configured for drawing bleed air from the compressor of the wing-mounted gas turbine engine of the aircraft.

3. The aircraft of claim 1, wherein the fluid passageway comprises a plurality of fluid passageways,
   wherein each fluid passageway of the plurality of fluid passageways comprises at least one valve disposed therein, and
   wherein the at least one valve comprises a variable throughput valve.

4. The aircraft of claim 1, wherein the surface of the fuselage defines a primary airflow reference line, and the fluid passageway and the plurality of injection ports define a secondary reference line such that the supplemental airflow is ejected along the secondary reference line,
   wherein the primary airflow reference line and the secondary reference line define an injection angle between five degrees and 85 degrees, and
   wherein a primary airflow following the primary reference line merges with the supplemental airflow at a top surface of the fuselage upstream of the boundary layer ingestion fan.

5. The aircraft of claim 4, wherein the injection angle is less than forty-five degrees,
   wherein the primary airflow is higher velocity than the supplmental airflow, and
   wherein the supplemental airflow causes at least a portion of the primary airflow to bypass the boundary layer ingestion fan.

6. The aircraft of claim 1, wherein the plurality of injection ports are spaced along the circumferential direction.

7. The aircraft of claim 1, wherein the plurality of injection ports are substantially unevenly spaced, and
   wherein the fluid passageway comprises at least one curved portion.

8. The aircraft of claim 7, wherein the plurality of injection ports are of varying sizes, and
   wherein the fluid passageway comprises at least two curved portions.

9. An aircraft air injection system comprising:
   a fuselage extending between a forward end and an aft end along a longitudinal direction and a boundary layer ingestion fan mounted to the fuselage at the aft end of the fuselage;
   a plurality of injection ports defined on a surface of the fuselage at a location upstream of the boundary layer ingestion fan; and
   a fluid passageway, the fluid passageway extending through the fuselage from at least one inlet port disposed at a bottom surface of the fuselage to the plurality of injection ports disposed at a top surface of the fuselage,
   wherein the plurality of injection ports are of varying sizes, and
   wherein the fluid passageway comprises at least two curved portions.

10. The system of claim 9, further comprising a boost fan, the boost fan being in fluid communication with the fluid passageway for increasing a pressure of the supplemental airflow, the boost fan controlled by at least one controller.

11. The system of claim 9, wherein the aircraft further comprises a wing-mounted gas turbine engine disposed longitudinally forward of the boundary layer ingestion fan, the wing-mounted gas turbine engine comprising a compressor, and
   wherein the fluid passageway is configured for drawing bleed air from the compressor of the gas turbine engine of the aircraft.

12. The system of claim 9, wherein the at least one inlet port further comprises a plurality of inlet ports are defined on a bottom surface of the fuselage and the fluid passageway extends between the plurality of inlet ports and the plurality of injection ports.

13. The system of claim 9, wherein the fluid passageway comprises a plurality of fluid passageways, and
   wherein the respective cross-sections of the plurality of injection ports and the at least one inlet port are at least one of elliptically-shaped, square-shaper, and oblong shaped.

14. The system of claim 9, wherein a surface of the fuselage defines a primary airflow reference line, and the fluid passageway and the plurality of injection ports define a secondary reference line such that the supplemental airflow is ejected along the secondary reference line, and
wherein the primary airflow reference line and the secondary reference line define an injection angle between five degrees and 85 degrees.

15. The system of claim 14, wherein the injection angle is less than forty-five degrees.

16. The system of claim 9, wherein the plurality of injection ports are substantially evenly sized.

17. An aircraft defining a longitudinal direction, a vertical direction, and a lateral direction, the aircraft comprising:
a fuselage extending between a forward end and an aft end along the longitudinal direction;
a boundary layer ingestion fan mounted to the fuselage at the aft end of the fuselage, the boundary layer ingestion fan defining a centerline and comprising a plurality of fan blades rotatable about the centerline; and
an air injection assembly comprising:
at lease one injection port defined on a top surface of the fuselage at a location upstream of the boundary layer ingestion fan; and
a fluid passageway, the fluid passageway extending through the fuselage and fluidly coupled upstream of the at least one injection port, the fluid passageway further comprising:
at least one valve disposed therein;
at least one first sensor disposed therein; and
a boost fan disposed therein upstream of the at least one valve.

18. The aircraft of claim 17, further comprising:
at least one second sensor disposed on a radially inward portion of a nacelle of the boundary layer ingestion fan, the at least one second sensor for measuring at least one of a pressure and a velocity of an airflow entering the boundary layer ingestion fan; and
at least one controller communicatively coupled to the at least one first sensor and the at least one second sensor,
wherein the at least one controller controls at least one of the boost fan and the at least one valve based at least partially on at least one signal from at least one of the at least one first sensor and the at least one second sensor, and
wherein the at least one valve comprises a variable throughput valve.

* * * * *